(12) United States Patent
Jewitt et al.

(10) Patent No.: US 11,866,369 B2
(45) Date of Patent: Jan. 9, 2024

(54) PHOSPHATE CEMENT COMPOSITIONS

(71) Applicant: ADVANCED POLYMERICS, INC., Salem, NH (US)

(72) Inventors: Stephen Jewitt, Wenham, MA (US); Meredith Morton, Pepperell, MA (US)

(73) Assignee: ADVANCED POLYMERICS, INC., Salem, NH (US)

( * ) Notice: Subject to any disclaimer, the term of this patent is extended or adjusted under 35 U.S.C. 154(b) by 111 days.

(21) Appl. No.: 17/155,835

(22) Filed: Jan. 22, 2021

(65) Prior Publication Data
US 2021/0230069 A1    Jul. 29, 2021

Related U.S. Application Data

(60) Provisional application No. 62/965,318, filed on Jan. 24, 2020.

(51) Int. Cl.
| | | |
|---|---|---|
| *C04B 28/34* | (2006.01) | |
| *C04B 24/26* | (2006.01) | |
| *C04B 40/00* | (2006.01) | |
| *C04B 24/38* | (2006.01) | |
| *C04B 111/00* | (2006.01) | |

(52) U.S. Cl.
CPC ........ *C04B 28/348* (2013.01); *C04B 24/2641* (2013.01); *C04B 24/383* (2013.01); *C04B 40/0046* (2013.01); *C04B 2111/00482* (2013.01)

(58) Field of Classification Search
CPC .............. C04B 28/348; C04B 24/2641; C04B 2111/00432; C04B 40/0046; C04B 24/383
USPC ............................................................ 524/8
See application file for complete search history.

(56) References Cited

U.S. PATENT DOCUMENTS

| | | | |
|---|---|---|---|
| 5,496,529 A | 3/1996 | Fogel et al. | |
| 6,458,423 B1 | 10/2002 | Goodson | |
| 6,783,799 B1 * | 8/2004 | Goodson ............... | C04B 41/009 427/403 |
| 2016/0068442 A9 | 3/2016 | Wagh et al. | |
| 2017/0121228 A1 * | 5/2017 | Patel ...................... | C09D 7/63 |

OTHER PUBLICATIONS

International Search Report and Written Opinion from corresponding PCT Appln. No. PCT/US2021/014648 dated Mar. 25, 2021.

* cited by examiner

*Primary Examiner* — Hui H Chin
(74) *Attorney, Agent, or Firm* — Grossman, Tucker, Perreault & Pfleger, PLLC

(57) ABSTRACT

The present invention pertains to a phosphate cement composition and process for making such composition. More particularly, it pertains to a phosphate cement coating and process for making the coating for application to a given substrate.

17 Claims, 1 Drawing Sheet

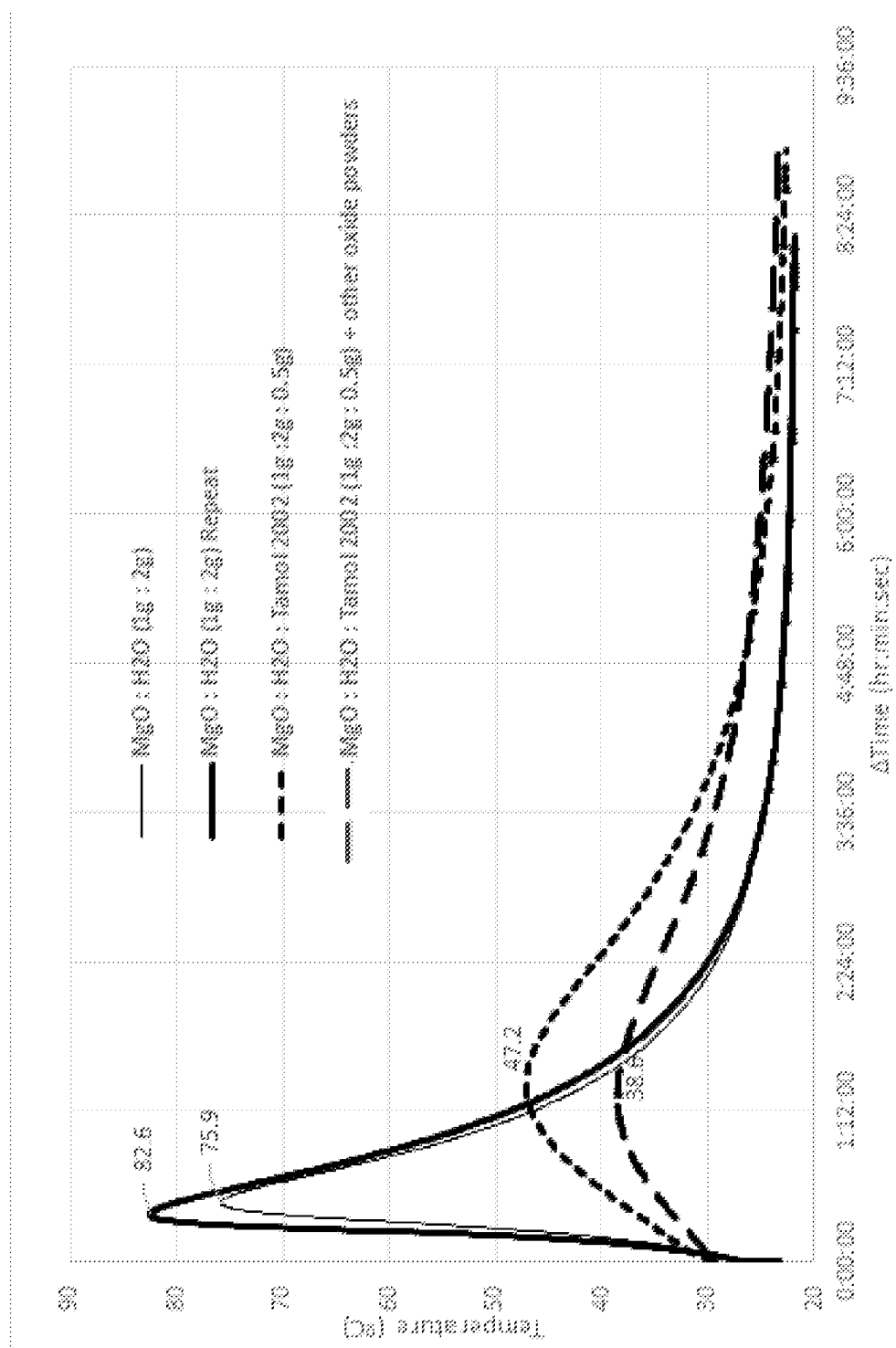

PHOSPHATE CEMENT COMPOSITIONS

CROSS REFERENCE TO RELATED APPLICATION

This application claims the benefit of U.S. Provisional Application No. 62/965,318, filed Jan. 24, 2020, the entire disclosure of which is incorporated herein by reference.

FIELD

The present invention pertains to a phosphate cement composition and process for making said composition. More particularly, it pertains to a phosphate cement coating and process for making said coating.

BACKGROUND

Alternately known as chemically bonded phosphate ceramics (CBPC's) or as acid-base cements (ABCs), phosphate cement compositions are typically formed by a reaction of an acid with a suitable base composed of metal oxides and hydroxides with water. Phosphate cements have been extensively commercialized and several products have been developed that range from dental cements, ceramics for stabilization of radioactive and hazardous waste streams, specialty cements for oil field applications, paints, coatings and adhesives, road patching materials and more.

More specifically, phosphate cement coatings are typically formed from the reaction of metal oxides, phosphoric acid and potassium phosphate. Such metal oxides are inclusive of magnesium, zinc, and aluminum forms. These metal oxides are partially soluble in water and convert to metal hydroxides. One purpose of such coatings is to provide an anticorrosive protection to ferrous metal substrates. See, e.g., *Chemically Bonded Phosphate Ceramics*, $2^{nd}$ Edition, A. S. Wagh, Elsevier, 2017, ISBN #9780080445052.

U.S. Pat. No. 5,496,529 entitled Aluminum Phosphates and Binder Compositions/Ceramic Materials Comprised Thereof, describes aluminum phosphates, in particular amorphous aluminum phosphate powders having a BET specific surface no greater than 25 $m^2/g$, as binders/hardeners or for the production of ceramic shaped articles. An aluminum oxide, hydroxide, or oxyhydroxide is combined with phosphoric acid or aluminum phosphate, e.g. an acid aluminum orthophosphate, in a liquid reaction medium devoid of inorganic acid anions other than of phosphoric acid, and then spray- or freeze-drying the suspension thus obtained. See, Abstract.

U.S. Pat. No. 6,458,423 entitled Sprayable Phosphate Cementitious Coatings And A Method And Apparatus For The Production Thereof discloses a sprayed-on phosphate coating formed from the combination of phosphoric acid solution and a base metal solution. The acid solution and base solution may be intermixed prior to spraying, during spraying, or on a substrate. See, Abstract.

U.S. Publ. No. 2017/0121228 entitled Inorganic-Organic Phosphate Ceramics And Coatings discloses an inorganic-organic metal phosphate ceramic coating from the reactions of an inorganic phosphate of a given formula and at least one metal oxide or hydroxide of a given formula and at least one polymer capable of reacting with at least the one metal oxide or hydroxide.

SUMMARY OF THE INVENTION

In one embodiment, the present invention relates to a phosphate cement coating precursor system comprising a first mixture where said mixture comprises phosphoric acid, phosphoric acid salt, acid-stabilized polymer and water wherein the pH of said first mixture is ≤6.0 and a second mixture comprising metal oxide and/or metal hydroxide and water.

In an associated embodiment, the present invention relates to a phosphate cement coating precursor system comprising a first mixture wherein said mixture comprises phosphoric acid, phosphoric acid salt and water and a second mixture comprising metal oxide and/or metal hydroxide, polymeric material and water wherein said polymeric material is present at a level of 0.1% by weight to 45.0% by weight in said second mixture.

In another associated embodiment, the present invention relates to a phosphate cement coating precursor system comprising a first mixture where said mixture comprises phosphoric acid, phosphoric acid salt, acid-stabilized polymer and water wherein the pH of the first mixture is ≤6.0; and a second mixture comprising metal oxide and/or metal hydroxide, polymeric material and water.

In a still further associated embodiment, the present invention relates to a method of producing a phosphate cement coating comprising providing a first mixture where said mixture comprises phosphoric acid, phosphoric acid salt, acid-stabilized polymer and water wherein the pH of the first mixture is ≤6.0. One then provides a second mixture comprising metal oxide and/or metal hydroxide, polymeric material and water wherein said polymeric material is present at a level of 0.1% by weight to 45.0% by weight in said second mixture. One then combines said first mixture and said second mixture and produces a phosphate cement coating.

BRIEF DESCRIPTION OF THE DRAWINGS

FIG. 1 is a plot of temperature rise versus time for the addition of a metal oxide in water, in the absence versus the presence of Tamol 2002 polymer.

DETAILED DESCRIPTION

One preferred objective of phosphate cement coatings is that they can be applied to a suitably prepared ferrous substrate to provide corrosion protection. To form such coatings, one embodiment of the present disclosure involves the use of an acidic component herein (Part A) containing phosphoric acid in combination with a phosphoric acid salt and water, where the Part A component preferably includes what can be described as an acid stabilized polymer (described herein). This Part A component is then preferably combined with a Part B component, containing metal oxides or hydroxides, where the Part B component is further described herein.

The part A component therefore includes a phosphoric acid salt that is preferably selected from potassium phosphate. It is contemplated that one may also utilize other phosphoric acid salts, such as magnesium phosphate, sodium phosphate, aluminum phosphate, ammonium phosphate, iron phosphate, zinc phosphate and combinations thereof. The level of phosphoric acid salt in the Part A mixture herein is preferably in the range of 20.0% by weight to 70.0% by weight. The level of phosphoric acid in the Part A mixture herein is also preferably in the range of 0.05% by weight to 25.0% by weight.

As noted above, an acid-stabilized polymer is now preferably incorporated into the Part A component. Reference to an acid-stabilized polymer is reference to a polymer that when introduced into the Part A mixture of phosphoric acid and phosphoric acid salt and water, which indicates a pH of ≤6.0, or more preferably at a pH of 1.0 to 6.0, the acid stabilized polymer is such that it preferably remains dispersed. That is, the acid stabilized polymer is such that the particle size of the acid stabilized polymer, when introduced into the Part A mixture, substantially remains at such particle size, and does not flocculate and otherwise form into particle sizes of higher orders of magnitude, resulting in clumping or masses of solid within the Part A mixture.

Preferably, the acid-stabilized polymers herein may be selected from acrylic acid polymers, acrylic polymers, ethylene vinyl acetate (EVA) polymers, polybutadienes, poly (vinyl chloride), polyvinylidene polymers (e.g. polyvinylidene chloride), polyurethanes, polyacrylamides, polyvinyl alcohols or mixtures thereof. It should be noted that such polymers preferably can include a surfactant to assist in maintaining such polymers as dispersed in the Part A mixture at a pH of ≤6.0. In addition, such polymers may preferably be made to include one or more functional groups to again assist in their ability to remain dispersed in the Part A mixture. For example, the functional group may preferably include an ionic group that interacts with the surfactant to assist in remaining dispersed.

Particularly preferred acid-stabilized polymers herein include polyvinylidene chloride, poly(vinyl chloride), poly-2-ethylhexyl acrylate and poly(acrylic acid). Such preferred acid-stabilized polymers include Polidene 37-0065 available from Borchers, which is identified as an aqueous anionic copolymer emulsion containing poly(acrylic acid). Other preferred acid-stabilized polymers include Haloflex 202 and Haloflex 202S, identified as a vinyl acrylic copolymer latex, available from DSM Coatings Resins.

Preferably, the amount of acid-stabilized polymer in the Part A mixture is such that the acid-stabilized polymer is present in Part A at a level of 0.1% by weight to 45.0% by weight. More preferably, the acid-stabilized polymer is present in Part A mixture at a level of 0.1% by weight to 40.0% by weight, or 0.1% by weight to 35.0% by weight, or 0.1% by weight to 30.0% by weight, 0.1% by weight to 25.0% by weight, 0.1% by weight to 20.0% by weight, 0.1% to 15.0% by weight, or 0.1% to 10.0% by weight.

As alluded to above, the incorporation of the acid-stabilized polymer into the Part A mixture is such that in the pH environment of ≤6.0, or in the range of pH of 1.0 to 6.0, the acid stabilized polymer remains dispersed. As may be appreciated, this particular capability to control against flocculation of the acid stabilized polymer tends to reduce the formation of a non-homogenous mixture, which may otherwise tend to cause agglomerations in the final coating formed herein. In addition, the ability to control against flocculation via use of the acid stabilized polymer herein now preferably provides the additional capability to reduce and/or eliminate the tendency of the spray apparatus, that is utilized to form the coatings, to plug, due to agglomerations of polymer that may otherwise lodge within the spray orifice. It can also be appreciated that via use of the acid-stabilized polymer, the shelf life of the Part A mixture may be significantly improved. Moreover, the use of the acid stabilized polymer in the Part A mixture necessarily introduces such polymer into the final coating, where the acid stabilized polymer can preferably increase tensile strength and ductility of the coating.

It can also be noted that while one may desire to adjust the pH of the Part A mixture to a pH above 7.0, such in turn may tend to result in flocculation of the metal phosphate species, thereby tending to form agglomerates of phosphate, and ultimately, a relatively non-homogenous coating with particulates in such coating. In addition, at a pH above 7.0, the neutralization of the metal phosphate species may tend to inhibit further reaction with the metal oxide and/or hydroxide when combined with the Part B mixture (described further herein) and as a result, a relatively poor coating may be produced. Accordingly, it can be appreciated that via use of the acid stabilized polymer herein, in the Part A mixture at a pH of ≤6.0, or in the range of pH at 1.0 to 6.0, various advantages are now realized including, but not limited to, improved spray performance of the Part A mixture, improved shelf life, improved reactivity when combined with the Part B mixture, along with improvement in adhesion and cohesion of a final coating on a given substrate surface.

Turning next to the Part B mixture, such mixture includes a metallic base component, which is reference to a metallic oxide in water where the metallic oxide may then undergo an exothermic reaction converting to a metallic hydroxide. Preferred metal oxides herein include magnesium oxide, zinc oxide, aluminum oxide, calcium oxide, molybdenum oxide, calcium oxide, tin oxide, nickel oxide, titanium oxide, iron oxide and zirconium oxide or mixtures thereof. A particular preferred oxide herein includes magnesium oxide. The metal oxide and/or metal hydroxide that the metal oxide may be converted to is preferably present in the Part B mixture in the range of 10.0% by weight to 50.0% by weight.

With regards to the above referenced exothermic reaction of the metallic oxide, one can regulate the exothermic reaction resulting from the conversion of the metal oxide to metal hydroxide by cooling or heating the precursor metal oxide material or using a jacketed vessel to control the temperature of the reacting components. The typical temperature rise observed at room temperature for a 100 gram batch of metal oxide material in water was observed to be no less than 75° C. for a 25% wt/vol solution. Such temperature rise may therefore typically fall in the range of 75° C. to 125° C. It is also noted that when dissolving, for example, magnesium oxide in water to form magnesium hydroxide, where there is an exotherm and accompanying temperature rise, the resulting mixture tends to become a solid mass after 24 hours that is not redispersible.

With such problems associated with the exothermic reaction occurring from the conversion of the metal oxide to the metal hydroxide, preferably, the Part B mixture herein is now formulated to itself include polymeric material. That is, upon addition of polymeric material into water, and subsequently adding metal oxide powder, the mixture was advantageously observed not to increase more than 60° C. from its initial temperature. Preferably, the temperature rise owing to the conversion of the metal oxide to the metal hydroxide may now be regulated to increase at the more limited range of 10° C. to 60° C., or even more preferably, in the range of 10° C. to 30° C. from the initial temperature of the mixture of water and polymeric material. The addition of polymer in the Part B mixture is therefore such that it then advantageously controls the temperature rise due to the exothermic conversion of the metal oxide to metal hydroxide when placed in the water. In addition, one may also preferably provide cooling when preparing the Part B mixtures herein.

The preferred polymers that may be utilized in the Part B mixture preferably include any polymeric material that may be dissolved, dispersed or emulsified in water. Such polymers may therefore preferably include acrylics, ethylene vinyl acetate polymer (EVA), polybutadienes, polyvinylidene polymers (e.g. polyvinylidene chloride), polyurethanes, polyacrylamides, poly(vinyl alcohols), styrene-acrylic copolymers, vinyl halide-acrylic copolymers, polyepoxides, or mixtures thereof. Particular preferred polymers for incorporation into the Part B mixture herein include Tamol 2002 available from Dow Chemical which is an un-neutralized polyacid copolymer.

Preferably, the level of polymer incorporated into the Part B mixture is in the range of 0.1% by weight to 45.0% by weight, or at a level of 0.1% by weight to 40.0% by weight, or 0.1% by weight to 35.0% by weight, or 0.1% by weight to 30.0% by weight, 0.1% by weight to 25.0% by weight, or 0.1% by weight to 20.0% by weight, or 0.1% to 15.0% by weight, or 0.1% to 10.0% by weight. In addition, one other preferred range is 5.0% by weight to 25.0% by weight. As noted above, by use of the polymer and with control of the exotherm caused by the conversion of the metal oxide to metal hydroxide, one is now able to more readily provide a relatively more flowable Part B formulation to combine with the Part A component to produce the subject coating. In addition, the incorporation of polymer into the Part B mixture has the additional advantage to regulate the concentration of oxides that are employed, as an increase in oxide concentration for a given coating application, that would otherwise result in an increase in exotherm and the associated tendency to form a solid mass due to such exotherm, can now be considered. In addition, the presence of the polymer in the Part B mixture will necessarily become part of the final coating, which will then preferably lead to a relatively higher tensile strength and increase in flexibility, thereby allowing for the formation of a relatively more durable coating than would otherwise be present in a traditional sprayed-on phosphate cement coating (i.e. formulations that are devoid of addition of acid-stabilized polymer in the Part A mixture and/or polymer in the Part B mixture).

It has also been advantageously found that cellulose may be included in the Part B mixture. The order of addition of the cellulose in the Part B mixture, containing polymer as described herein, is preferably as follows: (1) mix polymer and water; (2) add metal oxide; (3) allow the polymer/metal oxide and water to mix for a designated period of time, which is preferably 5 minutes to 9.0 hours. More preferably, the designated period of time is in the range of 2.0 to 3.0 hours. Preferably, the cellulose is also added before the peak exotherm occurs for the conversion of metal oxide to metal hydroxide.

It was observed that by proceeding according to the above protocol for delayed mixing cellulose into the Part B mixture, after the identified designated period of time, one will avoid the Part B mixture from solidifying over time upon an earlier introduction of the cellulose prior to addition of metal oxide. Therefore, by delaying the introduction of the cellulose, it was observed that the Part B mixture has more workable viscosity for use in the ensuing spray mixing with the Part A component. For example, a Part B mixture prepared with the above delayed incorporation of cellulose into the Part B mixture will indicate suitable and acceptable viscosity for spray application for a period of about 30 days. A workable and acceptable viscosity refers to the ability of the material to be free-flowing, as to not need mechanical means by which to start flowing wherein flow can be initiated by pouring or by shaking of the container holding the Part B mixture. If the cellulose is added to the Part B mixture prior to introduction of the metal oxide, one will typically observe solidification over the course of 24 hours, rendering it unsuitable for spray application with the Part A mixture herein.

In addition, it was observed that the incorporate of cellulose into the Part B mixture herein, according to the procedures herein, would provide for a Part A/Part B system that would accommodate variations in environmental conditions, such as temperature, air-flow and variable humidity during the coating application. That is, by incorporation of cellulose according to the procedures herein, the Part A/Part B spray coating was observed to proceed to form useful coatings which are more versatile with respect to tolerating different levels of humidity over a relative humidity of between 20% to 95%. Reference to a useful coating may be understood as a coating that bonds to the substrate and which generally protects the substrate from contact with water, sunlight, particulate contamination, biological organisms, etc.

Preferably, the cellulose that is utilized herein comprises particulate or fiber based cellulose. The particles or fibers may have a length of 0.05 µm to 120 µm and a diameter of 0.008 µm to 120 µm. Such cellulose may include cellulose sold under the name CreaTech TC150 from CreaFill Fibers Corp. It may also include Celova M250R-P and Celova M250S-G from Weidmann Fiber. Finally, it may also include Exilva F 01-L or Exilva P 01-L from Borregaard. In addition, the level of cellulose that is incorporated in the Part B mixture is preferably in the range of 0.1% by weight to 25.0% by weight.

Preferably, the Part A component and Part B component herein, with or without the use of cellulose, may be sprayed or brushed on to a carbon steel substrate surface. Preferably, the surface may be cleaned. Substrate surfaces may include itself, Portland cement concrete as well as asphalt and other mineral surfaces. The Part A and Part B components herein, with or without the use of cellulose, may be utilized in commercial sprayers/guns to spray coatings such as lacquers, enamels and other water based coatings. A preferred spraying apparatus includes an airless spray such as Wiwa's dual component spray equipment or Graco's plural component spray device. A non-limiting list of applications of the coatings herein includes coatings for steel tanks, pipelines, support and structural steel, roofing elements, chemical plant, cryogenic tanks, vehicles, bridges, oil platforms and exploration rigs, exhaust pipes, shipping containers, mining equipment, furnaces, cranes, power transmission infrastructure, cement blocks, and ship hulls and superstructures. Coating thicknesses herein may fall in the range of 10 µm to 400 µm.

EXAMPLES

Magnesium oxide powder was mixed into a container of water in the ratio of 1 g:2 g respectively. The material was stirred with a spatula. A thermocouple was placed into the center of the material to record temperature. The container was covered and kept in a room temperature environment (71° F.). After a few hours, there was condensate on the lid of the container. The following day, the data from the thermocouple was analyzed and graphed. This was repeated for consistency. The material was exothermic in both samples to a maximum of 79° C. (±3° C.) in 25 minutes 5 minutes. In both samples, the material had solidified, and was the consistency of cured cement. This material cannot be sprayed onto a metal substrate as it is solid.

Magnesium oxide powder was mixed into a container of water and Tamol™ 2002 (Dow Chemical) in the ratio of 1 g:2 g:0.5 g respectively. The material was stirred with a spatula. A thermocouple was placed into the center of the material to record temperature. The container was covered and kept in a room temperature environment (71° F.). The following day, there was no condensate on the lid, and the data from the thermocouple was analyzed and graphed. This was repeated with an addition of other oxide powders mixed into the magnesium oxide powder. The material was exothermic in both samples to a maximum of 43° C. (±4° C.) in 80 minutes. In both samples, the material was initially like putty, but turned back to a liquid when stirred by hand.

The results of the above are presented in FIG. 1, which identifies the temperature rise versus time for the identified mixtures of MgO in water, with and without the presence of Tamol 2002. For this experiment, the initial temperature of the mixture of the polymer in the water was at an initial ambient temperature, i.e., about 20° C. to 25° C. As can be seen, the presence of the Tamol was such that the exotherm from the conversion of MgO to MgOH is regulated not to increase more than 60° C. above such indicated initial and ambient temperature range.

Next, a control mixture was prepared comprising monopotassium phosphate powder mixed into a container of water and acid in the ratio of 12 g:5 g:2 g respectively. The material was stirred with an overhead mixer for 10 minutes then placed on the counter and covered. Some syneresis was observed within 10 minutes of sitting. This formulation was therefore not suitable for spraying.

A Part A mixture was prepared as described herein, containing monopotassium phosphate powder mixed into a container of water, Polidene 37-0065, and 85% phosphoric acid in the ratio of 30 g:14 g:1 g:5 g respectively. The material was stirred with an overhead mixer for 10 minutes then placed on the counter and covered. No syneresis was observed, so the mixture was placed into a spray cartridge and sprayed with a Part B magnesium oxide dispersion prepared herein in a twin feed cartridge system with 6" mixer nozzle and aerosolizer at the end. This Part B dispersion herein contained magnesium oxide, aluminum oxide, zinc oxide, Tamol 2002, cellulose, surfactant, and water.

Panels were then sprayed which were grit-blasted steel panels to standards SSPC-SP 5 White metal (NACE No. 1) ISO 8501 SA2½. The coating thickness target was 20-40 μm. After drying overnight, 5 adhesion dollies each measuring ¾" in diameter were adhered to the coating with epoxy. The epoxy adhesive dried overnight, and the adhesion dollies were removed in accordance to ASTM D4541-17. Table 1 below provides the results of testing on two such panels.

TABLE 1

| Panel # | Adhesion Values | Adhesion Average per Panel | Standard Deviation per Panel | Adhesion Average For Both Panels | Standard Deviation For Both Panels |
|---|---|---|---|---|---|
| 1 | 214 psi<br>193 psi<br>218 psi<br>218 psi<br>214 psi | 211.4 psi | 10.5 psi | 202.4 psi | 13.04 psi |
| 2 | 181 psi<br>198 psi<br>202 psi<br>189 psi<br>197 psi | 193.4 psi | 8.4 psi | | |

Additional Examples

Part A—Into a plastic mixing cup was placed 196 mL water and 70.45 g 85% phosphoric acid (Fisher). The mixing cup was placed in an overhead mixer with a 3" Cowles blade. The blade was lowered to within ½" of the bottom of the mixing container and centered in the container. The mixer speed was turned up until a good vortex was observed, as in approximately ½" diameter of the blade could be seen from in the vortex. While continuing to mix, 14.00 g Polidene 37-0065 (Borcher) was added. Following, 420.00 g of monopotassium phosphate (ICL) was added. To mitigate dust, this powder was added over a 1-minute span. The viscosity increased while adding, and the mixer speed was turned up until a good vortex was observed, as above. Once the powder was added, mixing continued for 5 minutes. The mixer was then turned off, and the material was removed from the mixer. This material was referred to as "Part A".

Part B—Into a metal mixing cup was combined 1.96 g Nuosperse FX 504 (Elementis), 380 mL distilled water, and 25.07 g Tamol 2002 (Dow Chemical). The mixing cup was placed in a container of ice, with no more than ⅓ the height of the container submerged in ice. This mixing cup with ice bath was placed in an overhead mixer with a 3" Cowles blade. The blade was lowered to within ½" of the bottom of the mixing cup and centered in the container. The mixer was set to 500 rpm and started. Into a separate container was combined 194.12 g magnesium oxide (ICL), 38.86 g aluminum oxide (Panadyne), and 38.86 g zinc oxide (ZoChem). These metal oxide powders were added to the mixing cup while the mixer continued at 500 rpm. Dust was mitigated by adding the oxide powder over a 1-minute span. Once the oxide powders were all added, the mixer was turned up to 800 rpm. Mixing continued at this speed for 2.5 hours. Ice was replenished when no ice cubes were visible at the top of the water in the ice bath. After mixing for 2.5 hours, the mixer speed was reduced to 500 rpm. 17.08 g cellulose (CreaTech) was added over a 1-minute time span to reduce dust. Once added, the mixer was turned up to 800 rpm again. Mixing continued for 30 minutes. Once the 30 minutes was complete, the mixer was stopped, and the mixing cup with ice bath was removed from the mixer and placed on the counter. The mixing cup was covered and sat in the ice bath on the counter overnight. The following morning, the cover was removed. Overnight, the ice had melted, producing a water bath that was at room temperature. The material was removed from the water bath. The material appeared to be solid, however, when a silicone spatula was inserted into the material, it turned to a liquid at the point where the spatula had been placed. The spatula was used to scrape the walls and bottom of the container. The container was then placed in the overhead mixer with 3" Cowles blade again. As before, the mixer blade was placed into the material within ½" of the bottom of the container. An ice bath did not accompany this part of the mix. The mixer was turned on at 800 rpm. After 2 minutes of mixing, the material was the consistency of whole milk. Because the viscosity was significantly lower than the viscosity of the Part A, 3.08 g Pangel S9 (Tolsa) was added to increase the viscosity to better match Part A's viscosity. After 5 minutes of mixing, the mixer was stopped, and the mixing cup was removed from the mixer. This material was referred to as "Part B".

Part A and Part B from above were each placed into a separate side of a 2-component cartridge at a mix ratio of 1:1. Both sides were sealed with a plunger. The tip of the cartridge was removed, and a disposable static mixer was placed where the tip had been. This static mixer had 24 mixing elements measuring 6.4 mm diameter. At the outlet of the static mixer was an air cap assembly which is designed to atomize the material as it comes out. Nordson EFD supplies all of the cartridge components. Previously grit-blasted steel panels prepared to standards SSPC-SP 5 White metal (NACE No. 1) ISO 8501 SA2% were placed at approximately 600 (±20°) pitch. The coating thickness target was 20-40 μm. The cartridge was placed into a cartridge dispensing gun, and set to an ejection speed of 2.5 for the first panel, and 8 for the second panel. The static mixer was changed between sprays, as the material cured in the static mixer nozzle when spraying was paused to change the set speed of the dispensing gun. Both panels were placed on a flat surface overnight to dry. After drying overnight, 5 adhesion dollies each measuring ¾" in diameter were adhered to the coating with epoxy. The epoxy adhesive dried overnight, and the adhesion dollies were removed in accordance to ASTM D4541-17. Table 2 below provides the results of testing on two such panels.

TABLE 2

| Panel # | Adhesion Values | Adhesion Average per Panel | Standard Deviation per Panel | Adhesion Average For Both Panels | Standard Deviation For Both Panels |
|---|---|---|---|---|---|
| 1 | 202 psi | 194.6 psi | 11.5 psi | 185.9 psi | 19.8 psi |
|   | 182 psi |  |  |  |  |
|   | 203 psi |  |  |  |  |
|   | 182 psi |  |  |  |  |
|   | 204 psi |  |  |  |  |
| 2 | 146 psi | 177.2 psi | 23.6 psi |  |  |
|   | 174 psi |  |  |  |  |
|   | 206 psi |  |  |  |  |
|   | 194 psi |  |  |  |  |
|   | 166 psi |  |  |  |  |

What is claimed is:

1. A method of producing a phosphate cement coating comprising:
  (a) providing a first mixture where said mixture comprises phosphoric acid, phosphoric acid salt, acid-stabilized polymer and water wherein the pH of the first mixture is ≤6.0;
  (b) providing a second mixture comprising metal oxide and/or metal hydroxide, polymeric material and water wherein said polymeric material is present at a level of 0.1% by weight to 45.0% by weight in said second mixture;
  (c) combining said first mixture and said second mixture and producing a phosphate cement coating and wherein said second mixture is prepared by combining polymeric material with water and adding said metal oxide wherein said metal oxide converts to metal hydroxide and the temperature of said second mixture does not increase by more than 60° C. from its initial temperature.

2. The method of claim 1, wherein said polymer, water and metal oxide are mixed for a designated period of time to form said second mixture and then introducing cellulose to said second mixture.

3. The method of claim 2 wherein said designated period of time is 5 minutes to 9.0 hours.

4. The method of claim 1 wherein said first mixture is prepared by combining phosphoric acid, phosphoric acid salt, acid-stabilized polymer and water, wherein 90% or more by weight of said acid-stabilized polymer remains dispersed in said first mixture after 48 hours at room temperature.

5. The method of claim 1 wherein said acid stabilized polymer is present in said first mixture at a level of 0.1% by weight to 45.0% by weight.

6. The method of claim 1 wherein the pH of said first mixture is in the range of 1.0 to 6.0.

7. The method of claim 1 wherein said acid stabilized polymer comprises acrylic acid polymers, acrylic polymers, ethylene vinyl acetate (EVA) polymers, polybutadienes, poly(vinyl chloride), polyvinylidenes, polyurethanes, polyacrylamides, polyvinyl alcohols or mixtures thereof.

8. The method of claim 1 wherein said metal oxide comprises magnesium oxide, zinc oxide, aluminum oxide, calcium oxide, molybdenum oxide, calcium oxide, tin oxide, nickel oxide, titanium oxide, iron oxide and zirconium oxide or mixtures thereof.

9. The method of claim 1 wherein said phosphoric acid salt comprises potassium phosphate, magnesium phosphate, sodium phosphate, aluminum phosphate, ammonium phosphate, iron phosphate, zinc phosphate, or mixtures thereof.

10. The method of claim 1 wherein said polymer material in said second mixture comprises acrylics, ethylene vinyl acetate polymer (EVA), polybutadienes, polyvinylidene polymers, polyurethanes, polyacrylamides, poly(vinyl alcohols), styrene-acrylic copolymers, vinyl halide-acrylic copolymers, polyepoxides, or mixtures thereof.

11. The method of claim 1 wherein said phosphoric acid is present at a level of 0.05% by weight to 25.0% by weight.

12. The method of claim 1 wherein said phosphoric acid salt is present at a level of 20.0% by weight to 70.0% by weight.

13. The method of claim 2 wherein the level of cellulose introduced to said second mixture is at a level of 0.10% by weight to 25.0% by weight.

14. A method of producing a phosphate cement coating comprising:
  (a) providing a first mixture where said mixture comprises phosphoric acid, phosphoric acid salt, acid-stabilized polymer and water wherein the pH of the first mixture is ≤6.0;
  (b) providing a second mixture comprising metal oxide and/or metal hydroxide, polymeric material and water wherein said polymeric material is present at a level of 0.1% by weight to 45.0% by weight in said second mixture wherein said metal oxide and/or metal hydroxide, polymeric material and water are mixed for a designated period of time of 5 minutes to 9.0 hours and introducing cellulose to said second mixture; and
  (c) combining said first mixture and said second mixture and producing a phosphate cement coating.

15. A method of producing a phosphate cement coating comprising:
  (a) providing a first mixture where said mixture comprises phosphoric acid, phosphoric acid salt, acid-stabilized polymer and water wherein the pH of the first mixture is ≤6.0 wherein said first mixture is prepared by combining phosphoric acid, phosphoric acid salt, acid-stabilized polymer and water, wherein 90% or more by weight of said acid-stabilized polymer remains dispersed in said first mixture after 48 hours at room temperature;
  (b) providing a second mixture comprising metal oxide and/or metal hydroxide, polymeric material and water wherein said polymeric material is present at a level of 0.1% by weight to 45.0% by weight in said second mixture; and
  (c) combining said first mixture and said second mixture and producing a phosphate cement coating.

16. A method of producing a phosphate cement coating comprising:
  (a) providing a first mixture where said mixture comprises phosphoric acid, phosphoric acid salt, acid-stabilized polymer and water wherein the pH of the first mixture is ≤6.0 wherein said phosphoric acid is present at a level of 0.05% by weight to 25.0% by weight;
(b) providing a second mixture comprising metal oxide and/or metal hydroxide, polymeric material and water wherein said polymeric material is present at a level of 0.1% by weight to 45.0% by weight in said second mixture;
(c) combining said first mixture and said second mixture and producing a phosphate cement coating.

17. A method of producing a phosphate cement coating comprising:
(a) providing a first mixture where said mixture comprises phosphoric acid, phosphoric acid salt, acid-stabilized polymer and water wherein the pH of the first mixture is ≤6.0 wherein said phosphoric acid salt is present at a level of 20.0% by weight to 70.0% by weight;
(b) providing a second mixture comprising metal oxide and/or metal hydroxide, polymeric material and water wherein said polymeric material is present at a level of 0.1% by weight to 45.0% by weight in said second mixture; and
(c) combining said first mixture and said second mixture and producing a phosphate cement coating.

* * * * *